US010093087B2

(12) United States Patent
Kawarada et al.

(10) Patent No.: US 10,093,087 B2
(45) Date of Patent: Oct. 9, 2018

(54) DISTANCE MEASURING DEVICE, IMAGE FORMING APPARATUS, AND DISTANCE MEASURING METHOD

(71) Applicants: Masaya Kawarada, Kanagawa (JP); Nobuyuki Satoh, Kanagawa (JP); Kenji Morita, Tokyo (JP); Yuichi Sakurada, Tokyo (JP); Tomohiro Sasa, Kanagawa (JP); Daisaku Horikawa, Kanagawa (JP)

(72) Inventors: Masaya Kawarada, Kanagawa (JP); Nobuyuki Satoh, Kanagawa (JP); Kenji Morita, Tokyo (JP); Yuichi Sakurada, Tokyo (JP); Tomohiro Sasa, Kanagawa (JP); Daisaku Horikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/696,960

(22) Filed: Sep. 6, 2017

(65) Prior Publication Data

US 2017/0361605 A1    Dec. 21, 2017

Related U.S. Application Data

(62) Division of application No. 15/163,138, filed on May 24, 2016, now Pat. No. 9,782,967.

(30) Foreign Application Priority Data

May 27, 2015    (JP) .................................. 2015-107914

(51) Int. Cl.
*B41J 29/393*    (2006.01)
*B41J 2/045*    (2006.01)
(Continued)

(52) U.S. Cl.
CPC ....... *B41J 2/04505* (2013.01); *B41J 2/04586* (2013.01); *B41J 2/125* (2013.01);
(Continued)

(58) Field of Classification Search
CPC ...... B41J 29/393; B41J 11/46; B41J 2/04505; B41J 2/2132; B41J 2/2135; B41J 19/145; G01B 11/14; G06K 15/102
See application file for complete search history.

(56) References Cited

U.S. PATENT DOCUMENTS 6,267,519 B1    7/2001    Otsuki et al.
2004/0056914 A1*    3/2004    Chun ..................... B41J 19/202
                                                                            347/19
(Continued)

FOREIGN PATENT DOCUMENTS

EP    1 027 999 A2    8/2000
JP    2011-161718    8/2011
JP    2012-187913    10/2012

OTHER PUBLICATIONS

U.S. Appl. No. 14/963,901, filed Dec. 9, 2015.
Extended European Search Report dated Nov. 23, 2016 in Patent Application No. 16171266.6.

*Primary Examiner* — Geoffrey Mruk
*Assistant Examiner* — Scott A Richmond
(74) *Attorney, Agent, or Firm* — Oblon, McClelland, Maier & Neustadt, L.L.P.

(57) ABSTRACT

A distance measuring device includes: an imaging unit that captures a test pattern image including a pair of first markers and a second marker that is formed under a condition different from a condition applied to the first markers; a position detecting unit that detects a position of each of the pair of first markers and the second marker in a captured image captured by the imaging unit; a ratio calculating unit that calculates a ratio of a distance between the pair of the (Continued)

first markers in the captured image and an actual distance between the pair of the first markers; and an actual distance calculating unit that calculates an actual distance between one of the first markers as the pair and the second marker by multiplying a distance between the one of the first markers as the pair and the second marker in the captured image by the ratio.

4 Claims, 11 Drawing Sheets

(51) Int. Cl.
| | |
|---|---|
| *G01B 11/14* | (2006.01) |
| *B41J 19/14* | (2006.01) |
| *B41J 2/21* | (2006.01) |
| *H04N 1/04* | (2006.01) |
| *G06K 15/10* | (2006.01) |
| *B41J 2/125* | (2006.01) |

(52) U.S. Cl.
CPC ........... *B41J 2/2135* (2013.01); *B41J 19/145* (2013.01); *B41J 29/393* (2013.01); *G01B 11/14* (2013.01); *G06K 15/102* (2013.01); *H04N 1/04* (2013.01)

(56) References Cited

U.S. PATENT DOCUMENTS

| | | | |
|---|---|---|---|
| 2009/0316164 A1* | 12/2009 | Takahashi | ................ B41J 29/38 358/1.8 |
| 2011/0205275 A1 | 8/2011 | Kimura et al. | |
| 2012/0218568 A1 | 8/2012 | Yorimoto et al. | |
| 2014/0300722 A1* | 10/2014 | Garcia | .................. G01B 11/02 348/77 |
| 2015/0158309 A1 | 6/2015 | Fujii et al. | |
| 2015/0375498 A1 | 12/2015 | Horikawa et al. | |
| 2016/0004202 A1 | 1/2016 | Morita et al. | |
| 2016/0080610 A1 | 3/2016 | Kawarada et al. | |
| 2016/0080611 A1 | 3/2016 | Yorimoto et al. | |

\* cited by examiner

DISTANCE MEASURING DEVICE, IMAGE FORMING APPARATUS, AND DISTANCE MEASURING METHOD

CROSS-REFERENCE TO RELATED APPLICATIONS

The present application is a divisional application of U.S. application Ser. No. 15/163,138, filed May 24, 2016, which claims priority under 35 U.S.C. § 119 to Japanese Patent Application No. 2015-107914 filed in Japan on May 27, 2015. The entire contents of the above-identified applications are incorporated herein by reference.

BACKGROUND OF THE INVENTION

1. Field of the Invention

The present invention relates to a distance measuring device, an image forming apparatus, and a distance measuring method.

2. Description of the Related Art

A typical inkjet image forming apparatus ejects ink from a recording head while moving a carriage, on which the recording head is mounted, in a reciprocating manner in a main-scanning direction, and forms an image on a recording medium. In this system, even if it is intended to attach the ink to the same position on the recording medium in forward movement and backward movement of the carriage, a positional deviation may occur. The positional deviation as described above may be referred to as a deviation of an ink landing position.

The deviation of the ink landing position may occur due to not only a difference in moving directions in the reciprocating movement but also an assembly error of the recording head with respect to the carriage, for example. That is, when an image is formed by using a plurality of recording heads, a relative positional relationship among the recording heads may not be maintained as designed due to an assembly error of each of the recording heads with respect to a carriage, and a deviation of an ink landing position among the recording heads may occur.

If the deviation of the ink landing position occurs, it is necessary to resolve the positional deviation by, for example, adjusting a parameter related to a position at which an image is formed by an image forming apparatus. To adjust the image forming position as described above, a method has been proposed in which a predetermined test pattern is formed on a recording medium, various sensors read the test pattern, and a deviation of an ink landing position is detected. For example, Japanese Patent Laid-open Publication No. 2011-161718 describes a method, in which a test pattern is formed so as to include a first dot group that is formed during forward movement of a carriage and include a second dot group and a third dot group that are formed during backward movement of the carriage, a two-dimensional image sensor captures an image of the test pattern, two-dimensional frequency characteristics of the test pattern is acquired by analyzing the captured image, and a deviation of an ink landing position between the forward movement and the backward movement of the carriage is detected based on the two-dimensional frequency characteristics.

To appropriately adjust the image forming position in accordance with the deviation of the ink landing position, it is necessary to obtain an amount of the positional deviation. As in the method described in Japanese Patent Laid-open Publication No. 2011-161718, when a method of detecting the deviation of the ink landing position by analyzing the captured image of the test pattern captured by the two-dimensional image sensor is to be used, it is possible to appropriately adjust the image forming position in accordance with the deviation of the ink landing position if an amount of an actual positional deviation (actual distance) can be obtained from the amount of the positional deviation in the captured image corresponding to the detected deviation of the landing position.

However, in the method described in Japanese Patent Laid-open Publication No. 2011-161718, while it is possible to detect an occurrence of the deviation of the ink landing position by analyzing the captured image of the test pattern, it is difficult to detect the amount of the positional deviation. Furthermore, even if the amount of the positional deviation in the captured image can be obtained, it is necessary to obtain a ratio of a distance in the captured image and an actual distance in order to obtain an actual distance from the amount of the positional deviation in the captured image. However, the ratio of the distance in the captured image and the actual distance changes with a change in a distance between the two-dimensional image sensor and an object, so that in an environment in which the distance between the two-dimensional image sensor and a detection pattern changes, it is difficult to obtain the actual distance from the amount of the positional deviation in the captured image.

SUMMARY OF THE INVENTION

It is an object of the present invention to at least partially solve the problems in the conventional technology.

According to exemplary embodiments of the present invention, there is provided a distance measuring device comprising: an imaging unit that captures an image of a test pattern including at least a pair of first markers and a second marker that is formed under a condition different from a condition applied to the pair of the first markers; a position detecting unit that detects a position of each of the first markers as the pair and the second marker in a captured image captured by the imaging unit; a ratio calculating unit that calculates a ratio of a distance between the pair of the first markers in the captured image and an actual distance between the pair of the first markers; and an actual distance calculating unit that calculates an actual distance between one of the first markers as the pair and the second marker by multiplying a distance between the one of the first markers as the pair and the second marker in the captured image by the ratio.

Exemplary embodiments of the present invention also provides an image forming apparatus comprising: an image forming unit that forms an image; a pattern forming unit that forms a test pattern including at least a pair of first markers and a second marker that is formed under a condition different from a condition applied to the pair of the first markers, by using the image forming unit; an imaging unit that captures an image of the test pattern; a position detecting unit that detects a position of each of the first markers as the pair and the second marker in a captured image captured by the imaging unit; a ratio calculating unit that calculates a ratio of a distance between the pair of the first markers in the captured image and an actual distance between the pair of the first markers; an actual distance calculating unit that calculates an actual distance between one of the first markers as the pair and the second marker by multiplying a distance between the one of the first markers as the pair and the second marker in the captured image by the ratio; and an adjusting unit that calculates an amount of a positional deviation based on the actual distance calculated by the actual distance calculating unit, and adjusts a parameter related to a position at which an image is formed by the image forming unit, in accordance with the amount of the positional deviation amount.

Exemplary embodiments of the present invention also provides a distance measuring method comprising: capturing an image of a test pattern including at least a pair of first markers and a second marker that is formed under a condition different from a condition applied to the pair of the first markers; detecting a position of each of the first markers as the pair and the second marker in a captured image captured at the capturing; calculating a ratio of a distance between the pair of the first markers in the captured image and an actual distance between the pair of the first markers; calculating an actual distance between one of the first markers as the pair and the second marker by multiplying a distance between the one of the first markers as the pair and the second marker in the captured image by the ratio.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. is a perspective view transparently illustrating an inside of an image forming apparatus according to an embodiment of the present invention.

DETAILED DESCRIPTION OF THE PREFERRED EMBODIMENTS

Exemplary embodiments of a distance measuring device, an image forming apparatus, a distance measuring method, and a computer-readable recording medium having a computer program according to the present invention will be described in detail below with reference to the accompanying drawings. In the embodiments described below, an inkjet printer that forms an image by ejecting ink on a recording medium will be explained as an example of the image forming apparatus according to the present invention. The image forming apparatus has functions to capture an image of a test pattern formed on a recording medium, calculate a distance corresponding to an amount of a positional deviation by using the captured image when an ink landing position is deviated, and adjust a parameter related to image formation. That is, the image forming apparatus of the embodiments has a function as a distance measuring device according to the present invention. However, the present invention is not limited to the embodiments described below. The present invention can be widely applied to various distance measuring devices and various types of image forming apparatuses that capture an image of a test pattern and measure a distance corresponding to an amount of a positional deviation by using the captured image.

Mechanical Configuration of an Image Forming Apparatus

Figure 1:
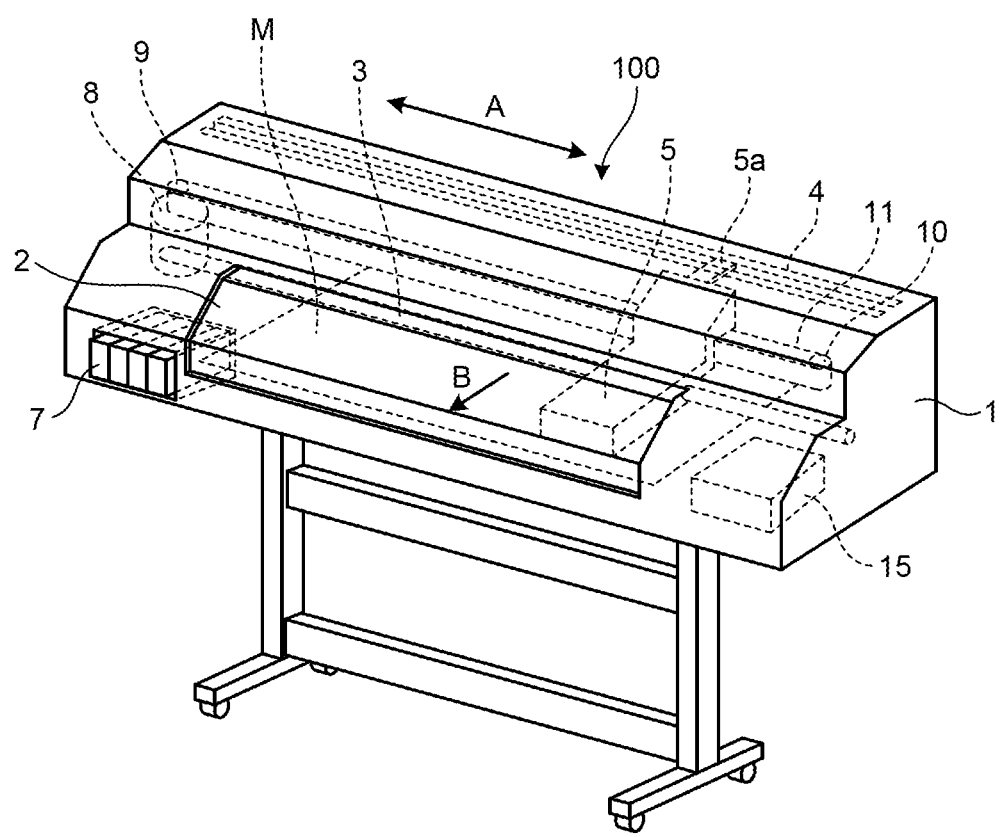
Figure 2:
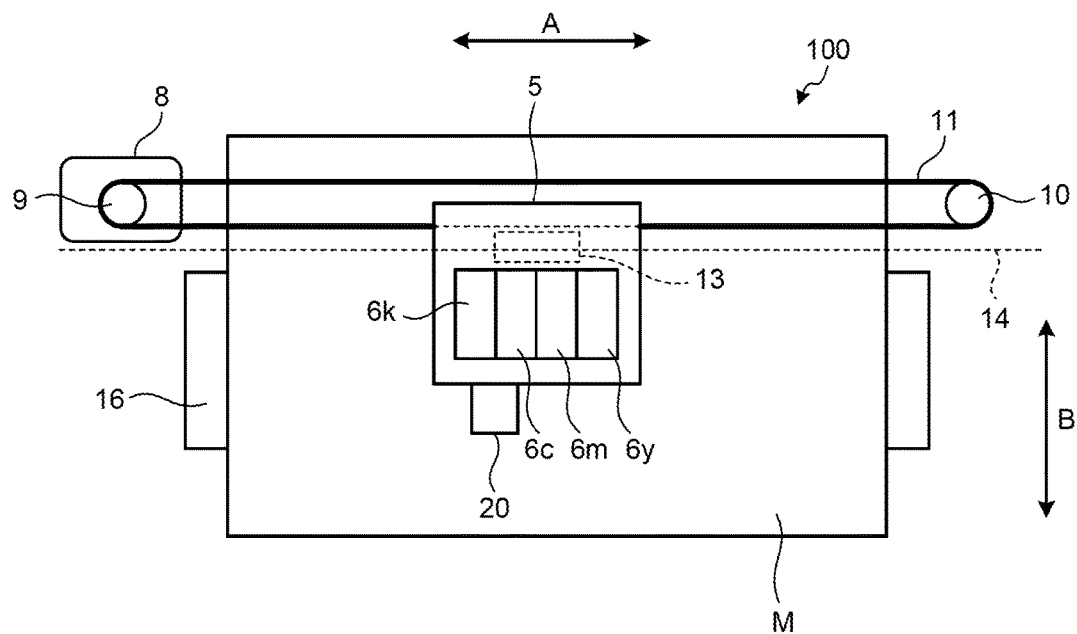
FIG. 2 is a top view illustrating a mechanical configuration of the inside of the image forming apparatus.
Figure 3:
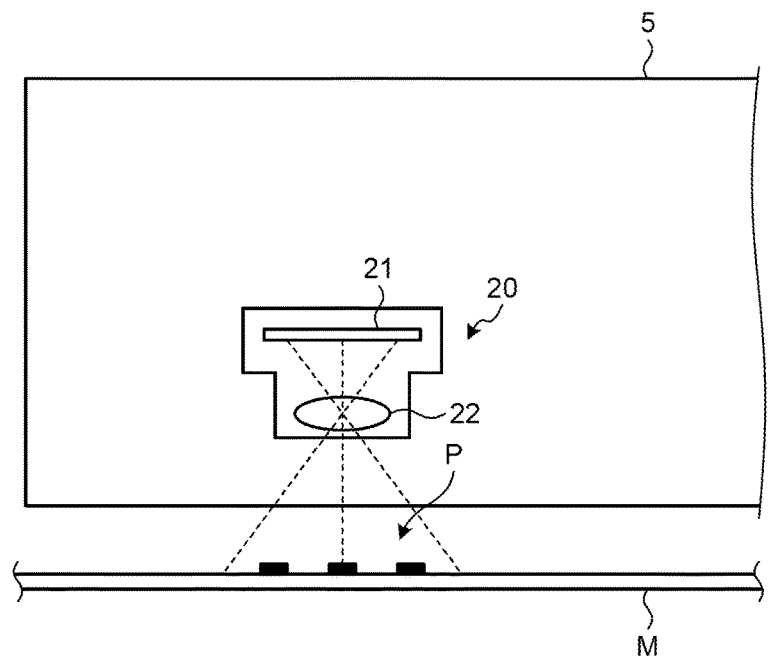
FIG. 3 is a diagram for explaining an imaging unit mounted on a carriage of the image forming apparatus.

First, a mechanical configuration example of an image forming apparatus 100 according to an embodiment will be described with reference to FIG. 1 to FIG. 3. FIG. 1 is a perspective view transparently illustrating an inside of the image forming apparatus 100. FIG. 2 is a top view illustrating a mechanical configuration of the inside of the image forming apparatus 100. FIG. 3 is a diagram for explaining an imaging unit 20 mounted on a carriage 5.

As illustrated in FIG. 1, the image forming apparatus 100 of the embodiment includes the carriage 5 that moves in a reciprocating manner in a main-scanning direction (in an arrow direction A in FIG. 1). The carriage 5 is supported by a main guide rod 3 extending along the main-scanning direction. A connection part 5a is provided on the carriage 5. The connection part 5a is engaged with a sub guide member 4 arranged parallel to the main guide rod 3, and stabilizes a posture of the carriage 5.

The carriage 5 is connected to a timing belt 11 that is extended between a drive pulley 9 and a driven pulley 10. The drive pulley 9 rotates by the drive of a main-scanning motor 8. The driven pulley 10 includes a mechanism that adjusts a distance to the drive pulley 9, and functions to apply a predetermined tension to the timing belt 11. The carriage 5 moves in a reciprocating manner in the main-scanning direction along with a conveying operation of the timing belt 11 caused by the drive of the main-scanning motor 8. As illustrated in FIG. 2 for example, a moving amount and a moving speed of the carriage 5 are controlled based on an encoder value that an encoder sensor 13 provided on the carriage 5 outputs by detecting a mark on an encoder sheet 14.

As illustrated in FIG. 2, recording heads 6y, 6m, 6c, and 6k are mounted on the carriage 5. The recording head 6y is a recording head for ejecting yellow (Y) ink. The recording head 6m is a recording head for ejecting magenta (N) ink. The recording head 6c is a recording head for ejecting cyan (C) ink. The recording head 6k is a recording head for ejecting black (B) ink. In the following, the recording heads 6y, 6m, 6c, and 6k are collectively described as a recording head 6. The recording head 6 is supported by the carriage 5 such that an ejection surface (nozzle surface) faces downward (toward a recording medium M side).

A cartridge 7 that is an ink supplier for supplying ink to the recording head 6 is not mounted on the carriage 5 but is arranged in a predetermined position inside the image forming apparatus 100. The cartridge 7 and the recording head 6 are connected to each other via a pipe, and ink is supplied from the cartridge 7 to the recording head 6 through the pipe.

As illustrated in FIG. 2, a platen 16 is arranged in a position facing the ejection surface of the recording head 6. The platen 16 supports the recording medium M when the recording head 6 ejects ink onto the recording medium M. A number of through holes penetrating through the platen 16 in a thickness direction are provided on the platen 16, and rib-shaped protrusions are provided so as to surround the respective through holes. By operating a suction fan provided on a surface of the platen 16 on the opposite side of the surface supporting the recording medium M, the recording medium M is prevented from coming off from the platen 16. The recording medium M is nipped by conveying rollers that are driven by a sub-scanning motor 12 (see FIG. 4) to be described later, and is intermittently conveyed in a sub-scanning direction (in an arrow direction B in FIG. 2) on the platen 16.

A plurality of nozzles are provided on the recording head 6 so as to be arranged in the sub-scanning direction. The image forming apparatus 100 of the embodiment intermittently conveys the recording medium M in the sub-scanning direction, moves the carriage 5 in a reciprocating manner in the main-scanning direction while the conveyance of the recording medium M is stopped, selectively drives a nozzle of the recording head 6 in accordance with image data, ejects ink from the recording head 6 onto the recording medium M on the platen 16, and records an image on the recording medium M.

The image forming apparatus 100 of the embodiment further includes a maintenance mechanism 15 that maintains reliability of the recording head 6. The maintenance mechanism 15 performs cleaning and capping of the ejection surface of the recording head 6, discharge of unnecessary ink from the recording head 6, or the like.

Furthermore, as illustrated in FIG. 2 and FIG. 3, the imaging unit 20 for capturing an image of a test pattern P (see FIG. 6) formed on the recording medium M, which will be described later, is mounted on the carriage 5. As illustrated in FIG. 3, the imaging unit 20 includes a two-dimensional image sensor 21, such as a charge coupled device (CCD) sensor or a complementary metal-oxide semiconductor (CMOS) sensor, and an imaging forming lens 22 that focuses an optical image of the test pattern P formed on the recording medium M onto a light-receiving surface of the two-dimensional image sensor 21. The imaging unit 20 converts light coming through the imaging forming lens 22 into an electrical signal by using the two-dimensional image sensor 21, and outputs the electrical signal as an captured image of the test pattern P.

For example, the imaging unit 20 is mounted on a side surface or the like of the carriage 5 with an arbitrary mounting member such that an optical axis of the imaging forming lens 22 is perpendicular to a sheet surface of the recording medium M set on the platen 16. Incidentally, the imaging unit 20 does not necessarily have to be mounted on the carriage 5 as long as it is arranged so as to appropriately capture an image of the test pattern P formed on the recording medium M.

The above-described components included in the image forming apparatus 100 of the embodiment are arranged inside an external body 1. A cover member 2 is provided on the external body 1 in an openable and closable manner. At the time of maintenance of the image forming apparatus 100 or when a paper lam occurs, it is possible to perform operations on each of the components provided inside the external body by opening the cover member 2.

Overall Configuration of a Control Mechanism of the Image Forming Apparatus

Figure 4:
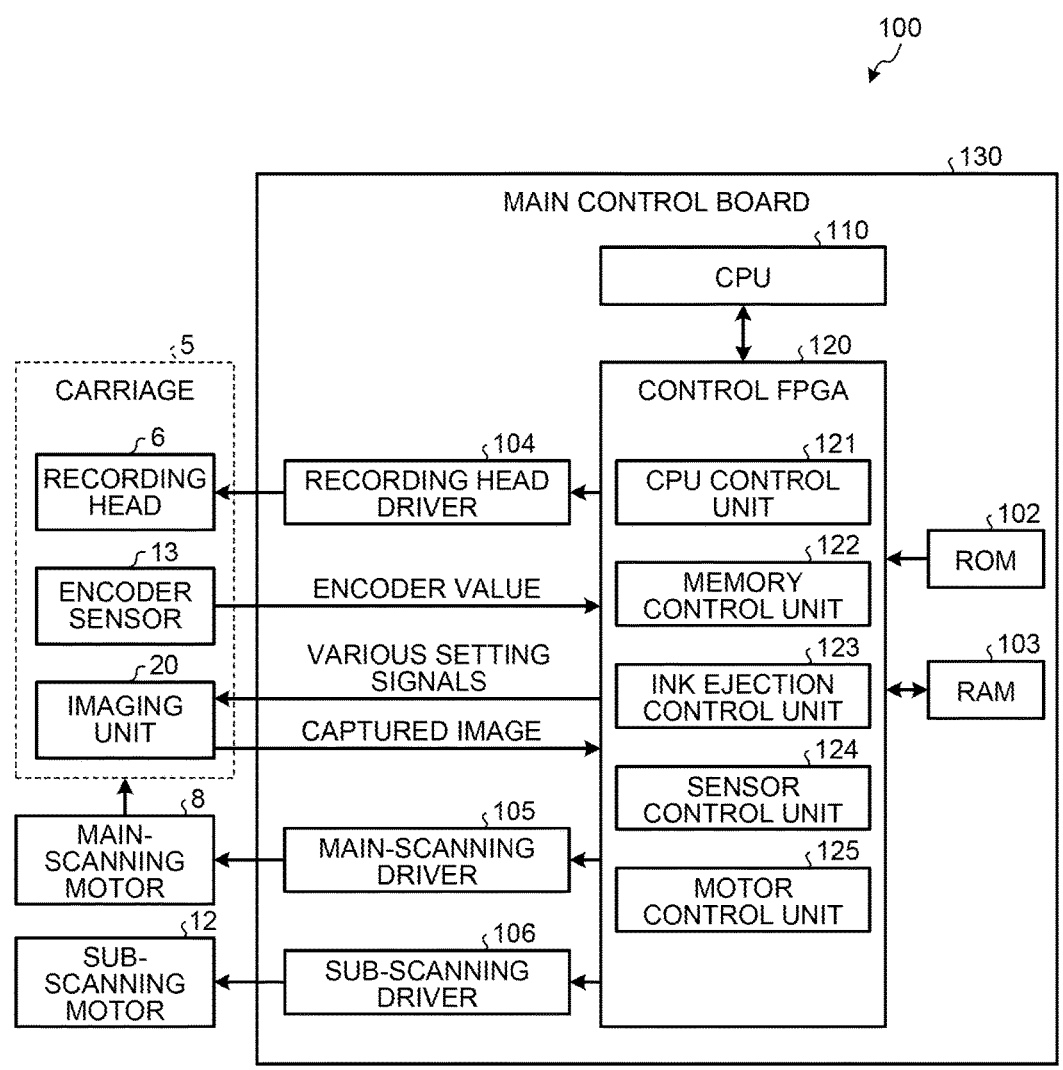
FIG. 4 is a block diagram illustrating a configuration example of a control mechanism of the image forming apparatus.

An overall configuration of a control mechanism of the image forming apparatus 100 of the embodiment will be described below with reference to FIG. 4. FIG. 4 is a block diagram illustrating a configuration example of the control mechanism of the image forming apparatus 100.

As illustrated in FIG. 4, the image forming apparatus 100 of the embodiment includes a central processing unit (CPU) 110, a read only memory (ROM) 102, a random access memory (RAM) 103, a recording head driver 104, a main-scanning driver 105, a sub-scanning driver 106, a control field-programmable gate array (FPGA) 120, the recording head 6, the encoder sensor 13, the imaging unit 20, the main-scanning motor 8, and the sub-scanning motor 12. The CPU 110, the ROM 102, the RAM 103, the recording head driver 104, the main-scanning driver 105, the sub-scanning driver 106, and the control FPGA 120 are mounted on a main control board 130. The recording head 6, the encoder sensor 13, and the imaging unit 20 are mounted on the carriage 5 as described above.

The CPU 110 controls the entire operation of the image forming apparatus 100. For example, the CPU 110 executes various control programs stored in the ROM 102 by using the RAM 103 as a work area, and outputs a control command to control various operations in the image forming apparatus 100. In particular, in the image forming apparatus 100 of the embodiment, the CPU 110 implements a function to form a test pattern, a function as the distance measuring device, a function to adjust a parameter related to the image forming position based on a distance, and the like. These functions will be described in detail later.

The recording head driver 104, the main-scanning driver 105, and the sub-scanning driver 106 are drives for driving the recording head 6, the main-scanning motor 8, and the sub-scanning motor 12, respectively.

The control FPGA 120 controls various operations in the image forming apparatus 100 in cooperation with the CPU 110. For example, the control FPGA 120 includes, as functional components, a CPU control unit 121, a memory control unit 122, an ink ejection control unit 123, a sensor control unit 124, and a motor control unit 125.

The CPU control unit 121 communicates with the CPU 110 to send various kinds of information acquired by the control FPGA 120 to the CPU 110 and input a control command output from the CPU 110.

The memory control unit 122 performs memory control for causing the CPU 110 to access the ROM 102 or the RAM 103.

The ink ejection control unit 123 controls an operation of the recording head driver 104 in accordance with the control command from the CPU 110, thereby controlling a timing of ejecting ink from the recording head 6 driven by the recording head driver 104.

The sensor control unit 124 performs a process on a sensor signal, such as an encoder value, output from the encoder sensor 13. For example, the sensor control unit 124 performs a process of calculating a position, a moving speed, a moving direction, and the like of the carriage 5 on the basis of the encoder value output from the encoder sensor 13.

The motor control unit 125 controls an operation of the main-scanning driver 105 in accordance with the control command from the CPU 110, thereby controlling the main-scanning motor 8 driven by the main-scanning driver 105 and controlling movement of the carriage 5 in the main-scanning direction. Furthermore, the motor control unit 125 controls an operation of the sub-scanning driver 106 in accordance with the control command from the CPU 110, thereby controlling the sub-scanning motor 12 driven by the sub-scanning driver 106 and controlling movement of the recording medium M in the sub-scanning direction on the platen 16.

Incidentally, the above-described components are examples of control functions implemented by the control FPGA 120, and various other control functions may also be implemented by the control FPGA 120. Furthermore, all or part of the above-described control functions may be implemented by a computer program executed by the CPU 110 or a general-purpose CPU. Moreover, part of the above-described control functions may be implemented by a dedicated hardware, such as an FPGA different from the control FPGA 120 or an application specific integrated circuit (ASIC).

The recording head 6 is driven by the recording head driver 104, operation of which is controlled by the CPU 110 and the control FPGA 120, and forms an image by ejecting ink onto the recording medium M on the platen 16.

The encoder sensor 13 outputs, to the control FPGA 120, an encoder value that is obtained by detecting a mark on the encoder sheet 14. The encoder value is used by the sensor control unit 124 of the control FPGA 120 to calculate the position, the moving speed, and the moving direction of the carriage 5. The position, the moving speed, and the moving direction of the carriage 5 that the sensor control unit 124 has calculated from the encoder value are sent to the CPU 110. The CPU 110 generates a control command for controlling the main-scanning motor 8 based on the position, the moving speed, and the moving direction of the carriage 5, and outputs the control command to the motor control unit 125.

The imaging unit 20 captures an image of a test pattern formed on the recording medium M and outputs the captured image of the test pattern, under the control of the CPU 110. The captured image of the test pattern output from the imagine unit 20 is sent to the control FPGA 120, and temporarily stored in a predetermined storage area, such as the RAM 103. The imaging unit 20 is provided with a function to perform analog-to-digital (AD) conversion on an analog signal obtained through photoelectric conversion performed by the two-dimensional image sensor 21 into digital image data, perform various kinds of image processing, such as shading correction, white balance correction, or gamma correction, on the image data, and output the image data subjected to the image processing. Various operating conditions of the two-dimensional image sensor 21 are set in accordance with various setting signals transferred from the CPU 110 via the control FPGA 120. Incidentally, part or all of various kinds of image processing on the image data may be performed outside the imaging unit 20.

In the image forming apparatus 100 of the embodiment, an image forming unit that forms an image on the recording medium M includes the recording head driver 104, the main-scanning driver 105, and the sub-scanning driver 106 that are controlled by the CPU 110 and the control FPGA 120 as described above, and includes the recording head 6, the main-scanning motor 8, and the sub-scanning motor 12 that are driven by the above-described drivers.

Functions Implemented by the CPU

Figure 5:
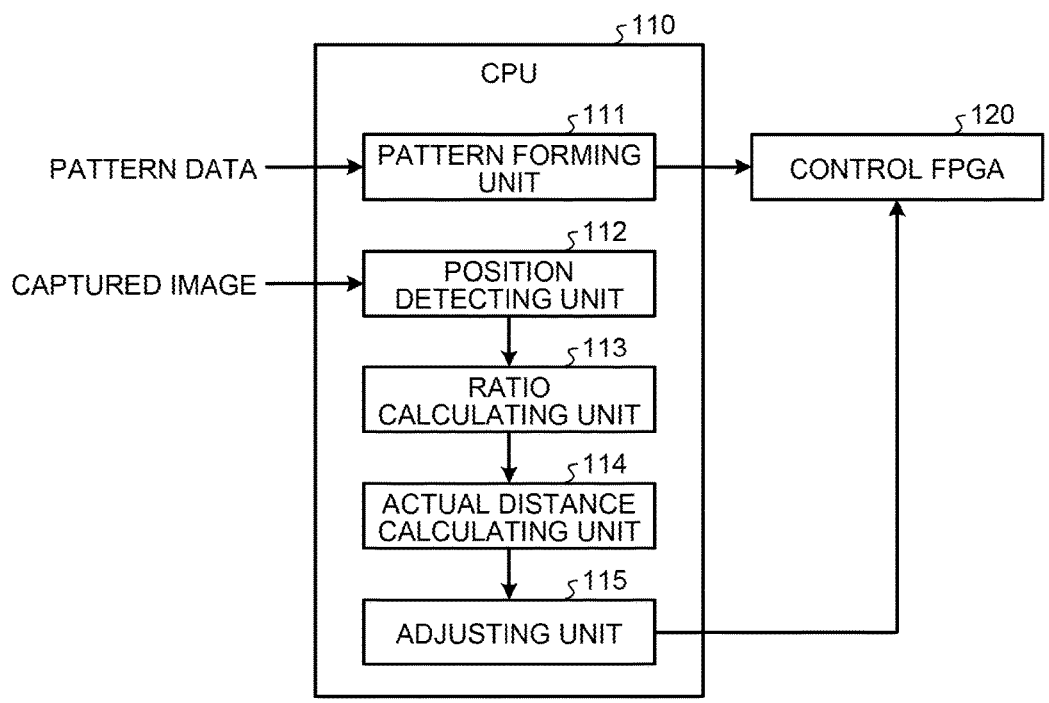
FIG. 5 is a block diagram illustrating a functional configuration example of a CPU of the image forming apparatus.

Characteristic functions implemented by the CPU 110 will be described below with reference to FIG. 5. FIG. 5 is a block diagram illustrating a functional configuration example of the CPU 110. As illustrated in FIG. 5, the CPU 110 implements functional components, such as a pattern forming unit 111, a position detecting unit 112, a ratio calculating unit 113, an actual distance calculating unit 114, and an adjusting unit 115, by executing a control program stored in the ROM 102 while using the RAM 103 as a work area, for example.

Figure 6:
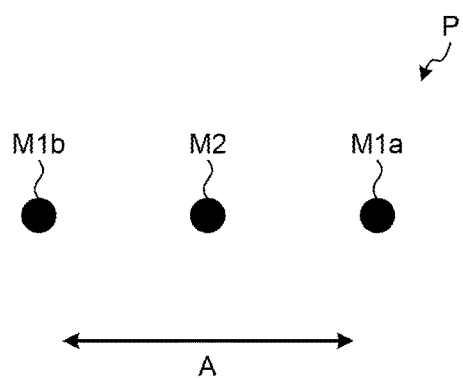
FIG. 6 is a diagram illustrating an example of a test pattern using in the image forming apparatus.

The pattern forming unit Ill reads pattern data that is stored in advance in, for example, the ROM 102, and causes the above-described image forming unit to perform an image forming operation in accordance with the pattern data to thereby form a test pattern P on the recording medium M. FIG. 6 is a diagram illustrating an example of the test pattern P. The test pattern P includes at least a pair of first markers M1a and M1b and a second marker M2. The second marker M2 is formed under a condition different from a condition applied to the pair of the first markers M1a and M1b. The different condition described here indicates, for example, a difference in the moving direction of the carriage 5 mounted with the recording head 6, a difference in the recording head 6 that ejects ink, or the like.

In the following descriptions, it is assumed that the second marker M2 is generated under a condition in which the moving direction of the carriage 5 (forward movement or backward movement) is different from that of the pair of the first markers M1a and M1b. As described above, an ink landing position may be deviated between the forward movement and the backward movement of the carriage 5. Therefore, among the pair of the first markers M1a and M1b and the second marker M2 included in the test pattern P, a positional relationship between the pair of the first markers M1a and M1b is hardly changed, but a positional relationship of the second marker M2 relative to the pair of the first markers M1a and M1b may be deviated. This positional deviation corresponds to a deviation of an ink landing position due to a difference between the forward movement and the backward movement of the carriage 5.

Incidentally, the same applies to a case where the second marker M2 is formed by using the recording head 6 different from the recording head 6 used for the pair of the first markers M1a and M1b. Specifically, if a relative positional relationship between the recording heads 6 is deviated from a design value due to an assembly error of the recording heads 6 with respect to the carriage 5, the deviation appears as a deviation of the ink landing position. In this case, if the second marker M2 is formed by using the recording head 6 different from the recording head 6 used for the pair of the first markers M1a and M1b, the positional relationship between the pair of the first markers M1a and M1b is hardly changed, but the positional relationship of the second marker M2 relative to the pair of the first markers M1a and MIb is deviated among the pair of the first markers M1a and M1b and the second marker M2 included in the test pattern P.

In FIG. 6, the test pattern P, in which the second marker M2 is formed in a position corresponding to the midpoint between the pair of the first markers M1a and M1b, and, in the following descriptions, it is assumed that the test pattern P is formed in this manner. However, it is sufficient that the test pattern P includes the pair of the first markers M1a and M1b and the second marker M2 that is formed under a condition different from a condition applied the pair of the first markers M1a and M1b, and the positional relationship between the second marker M2 and the pair of the first markers M1a and M1b can be set arbitrarily. The position and a timing (whether a mark is formed during the forward movement or the backward movement of the carriage 5 is determined by the timing) for forming each of the first markers M1a and M1b, as a pair, and the second marker M2 included in the test pattern P are indicated by the above-described pattern data.

Figure 7A:
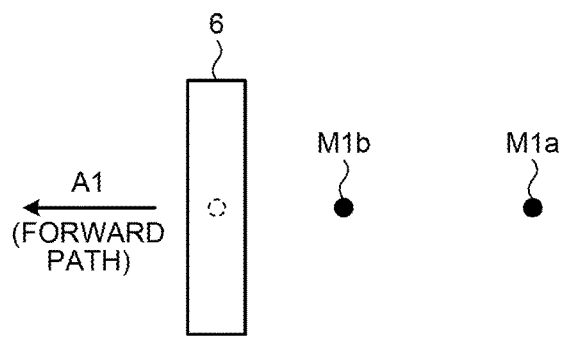
FIG. 7A is a diagram for explaining a test pattern forming method according to the embodiment.
Figure 7B:
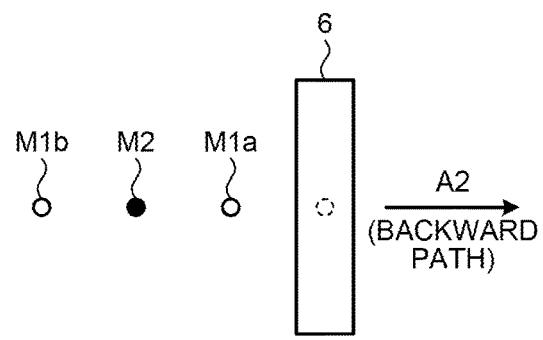
FIG. 7B is a diagram for explaining a test pattern forming method according to the embodiment.

FIGS. 7A and 7B are diagrams for explaining a method of forming the test pattern P illustrated in FIG. 6. For example, as illustrated in FIG. 7A, the pair of the first markers M1a and M1b included in the test pattern P is formed by causing a predetermined nozzle, which is indicated by a dashed line circle in the drawing among a plurality of nozzles included in the recording head 6 mounted on the carriage 5, to eject ink onto the recording medium M during the forward movement of the carriage 5 (movement in an arrow direction A1 in FIG. 7A). In contrast, as illustrated in FIG. 7B for example, the second marker M2 included in the test pattern P is formed by causing the same nozzle as the nozzle that has ejected ink for forming the pair of the first markers M1a and M1b among the plurality of the nozzles included in the recording head 6 mounted on the carriage 5 to elect ink onto the recording medium M during the backward movement of the carriage 5 (movement in an arrow direction A2 in the drawing). Therefore, the test pattern P as illustrated in FIG. 6, in which the pair of the first markers M1a and M1b and the second marker M2 are aligned along the main-scanning direction, is formed on the recording medium M.

Incidentally, while the pair of the first markers M1a and M1b is formed during the forward movement of the carriage 5 and the second marker M2 is formed during the backward movement of the carriage 5 in the example in FIG. 7, it may be possible to form the second marker M2 during the forward movement of the carriage 5 and form the pair of the first markers M1a and M1b during the backward movement of the carriage 5 in a manner opposite to the above-described example. Furthermore, while it is explained that the pair of the first markers M1a and M1b and the second marker M2 are formed by causing the same nozzle among the nozzles included in the recording head 6 to eject ink, it may be possible to use different nozzles for ejecting ink to form the pair of the first markers M1a and M1b and for ejecting ink to form the second marker M2. In this case, if a positional deviation occurs between the nozzles in the main-scanning direction, the deviation has a certain influence. However, the positional deviation between the nozzles in the single recording head 6 is extremely small as compared to a deviation in an ink landing position due to a difference in the moving direction of the carriage 5, and is at a negligible level.

The above-described test pattern P formed on the recording medium M by the pattern forming unit is captured by the imaging unit 20. A captured image of the test pattern P output from the imaging unit 20 is stored in the RAM 103 or the like via the control FPGA 120, and is temporarily held.

Referring back to FIG. 5, the position detecting unit 112 reads the captured image of the test pattern P, which has been captured by the imaging unit 20 and stored in the RAM 103 or the like, performs a predetermined process, such as a binarization process, on the captured image, and detects a position of each of the first markers M1a and M1b, as a pair, and the second marker M2 in the captured image. The positions detected here are positions on the two-dimensional coordinates of an image represented in units of pixels. In many cases, the pair of the first markers M1a and M1b and the second marker M2 in the captured image are detected as a lump of pixels, and, for example, it is sufficient to detect a predetermined representative position, such as the position of the center of gravity of the lump, as the position of each of the first markers M1a and M1b and the second marker M2. The positions of the pair of the first markers M1a and M1b and the second marker M2 in the captured image detected by the position detecting unit 112 are sent to the ratio calculating unit 113.

The ratio calculating unit 113 calculates a ratio of a distance between the pair of the first markers M1a and M1b in the captured image and an actual distance between the pair of the first markers M1a and M1b. The actual distance is an actual distance in the test pattern P formed on the recording medium M, and is represented by a unit, such as millimeter (mm). As described above, the positional relationship between the pair of the first markers M1a and M1b included in the test pattern P is hardly changed; therefore, a distance between a position at which the first marker M1a as one of the pair is formed and a position at which the first marker M1b as the other one of the pair is formed, where the positions are obtained from the pattern data, can be assumed as the actual distance between the pair of the first markers M1a and M1b. Furthermore, the distance between the pair of the first markers M1a and M1b in the captured image can be obtained as a distance in units of pixels between the position of the first marker M1a as one of the pair and the position of the first marker M1b as the other one of the pair in the captured image, where the positions are detected by the position detecting unit 112. The ratio calculating unit 113 calculates a ratio of the distance between the pair of the first markers M1a and M1b in the captured image and the actual distance between the pair of the first markers M1a and M1b obtained as described above. The above-described ratio calculated by the ratio calculating unit 113 is sent to the actual distance calculating unit 114.

Figure 8:
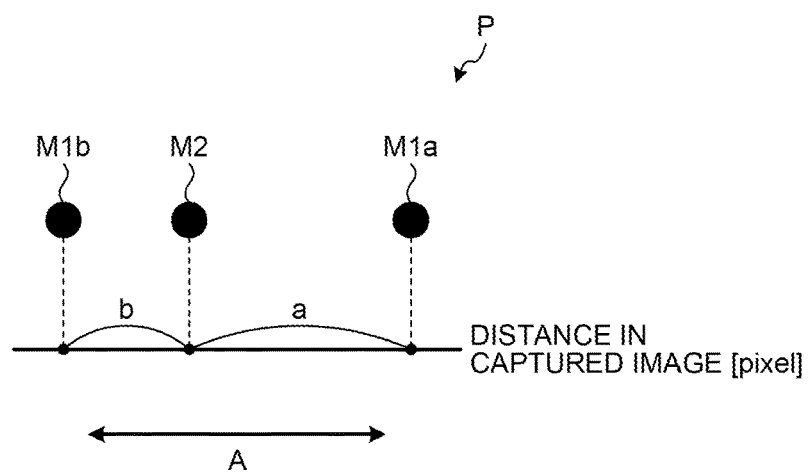
FIG. 8 is a diagram for explaining an example in which a relative positional deviation has occurred between a pair of first markers and a second marker.

A case will be described below, in which a relative positional deviation occurs between the second marker M2 and the pair of the first markers M1a and M1b when the test pattern P illustrated in FIG. 6 is formed on the recording medium M. FIG. 8 is a diagram for explaining an example in which a relative positional deviation occurs between the second marker M2 and the pair of the first markers M1a and M1b included in the test pattern P. As described above, the test pattern P illustrated in FIG. 6 is expected to be formed such that the second marker M2 is formed in the position corresponding to the midpoint between the pair of the first markers M1a and M1b. However, as illustrated in FIG. 8, it is assumed that the second marker M2 is formed in a position close to the first marker M1b due to a deviation in an ink landing position caused by a difference in the moving direction between the forward movement and the backward movement. A distance between the first marker M1a and the second marker M2 in the captured image at this time is denoted by a, and a distance between the first marker M1b and the second marker M2 in the captured image at this time is denoted by b. The distances a and b in the captured image can be obtained by using a detection result obtained by the position detecting unit 112, and are represented in units of pixels.

Even when the relative positional deviation occurs between the second marker M2 and the pair of the first markers M1a and M1b, the actual distance between the pair of the first markers M1a and M1b does not change because the first markers M1a and M1b as a pair are formed under the same condition (the same moving direction). That is, an actual distance corresponding to a+b in FIG. 8 does not change even when the relative positional deviation occurs between the second marker M2 and the pair of the first markers M1a and M1b. Therefore, the ratio of the distance a+b between the pair of the first markers M1a and M1b in the captured image and the actual distance between the pair of the first markers M1a and M1b represents a ratio (image magnification) between a distance in the captured image and an actual distance.

Figure 9:
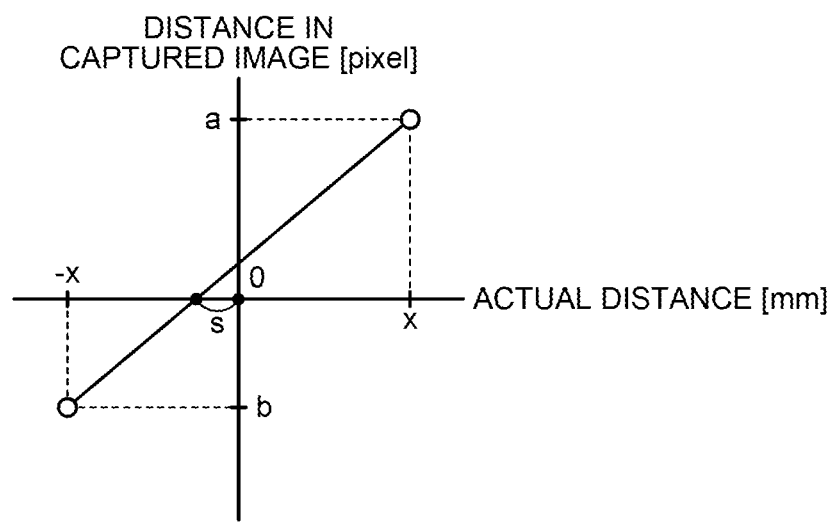
FIG. 9 is a diagram for explaining a ratio of a distance between the pair of the first markers in a captured image and an actual distance between the pair of the first markers.

FIG. 9 is a diagram for explaining the ratio of the distance between the pair of the first markers M1a and M1b in the captured image and the actual distance between the pair of the first markers M1a and M1b, and illustrating an example in which each of the positions of the first markers M1a and M1b as a pair is plotted on the coordinates where the origin is the midpoint between the pair of the first markers M1a and M1b, the horizontal axis is the actual distance, and the vertical axis is the distance in the captured image. In the example in FIG. 9, it is assumed that a relative positional deviation as illustrated in FIG. 8 has occurred between the second marker M2 and the pair of the first markers M1a and M1b.

In FIG. 9, the slope of a straight line connecting the positions of the plotted first markers M1a and M1b as a pair corresponds to the rate of the distance between the pair of the first markers M1a and M1b in the captured image and the actual distance between the pair of the first markers M1a and M1b. That is, the slope of the straight line represents the ratio (image magnification) between the distance in the captured image and the actual distance. Furthermore, the position of the second marker M2 is the origin when a relative positional deviation between the second marker M2 and the pair of the first markers M1a and M1b does not occur; therefore, a distance s between the origin and an intersection of the straight line connecting the positions of the plotted first markers M1a and M1b as a pair and the horizontal axis corresponds to an amount of the positional deviation between the second marker M2 and the pair of the first markers M1a and M1b.

An actual distance 2x between the pair of the first markers M1a and M1b can be obtained from the pattern data as described above. Therefore, if the distance a+b between the pair of the first markers M1a and M1b in the captured image is obtained, it is possible to calculate the above-described ratio. As described above, the distance a+b between the pair of the first markers M1a and M1b in the captured image can be obtained by using a detection result obtained by the position detecting unit 112, and therefore, it is possible to calculate the above-described ratio.

The above-described ratio changes with a change in the distance between the imaging unit 20 and the test pattern P. As described above, the image forming apparatus 100 of the embodiment is configured to support the recording medium M with the formed test pattern P on the platen 16 having a concave-convex shape provided with the rib-shaped protrusions. Therefore, a distance between the imaging unit 20 and the test pattern P may change due to the influence of the concave-convex shape of the platen 16, leading to a change in the above-described ratio.

Figure 10:
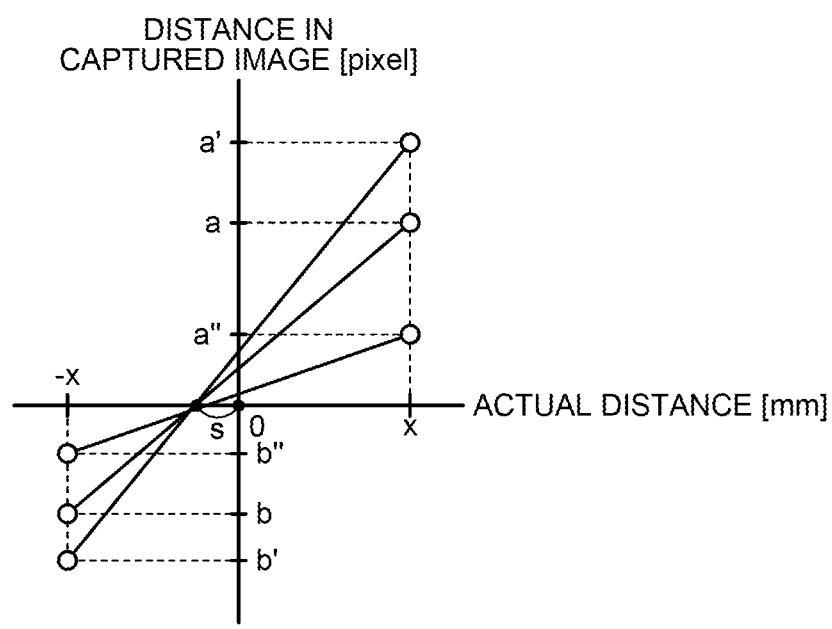
FIG. 10 is a diagram for explaining a change in the ratio due to a change in a distance between the imaging unit and the test pattern.

FIG. 10 is a diagram for explaining a change in the ratio with a change in the distance between the imaging unit 20 and the test pattern P. If the distance between the imaging unit 20 and the test pattern P is reduced, the distance between the first marker M1a and the second marker M2 in the captured image is increased to a' relative to the distance a illustrated in FIG. 8, and the distance between the first marker M1b and the second marker M2 in the captured image is increased to b' relative to the distance b illustrated in FIG. 8. Therefore, the slope of the straight line connecting the positions of the plotted first markers M1a and M1b as a pair, that is, the above-described ratio, is increased relative to the slope illustrated in FIG. 9. In contrast, if the distance between the imaging unit 20 and the test pattern P is increased, the distance between the first marker M1a and the second marker M2 in the captured image is reduced to a relative to the distance a illustrated in FIG. 8, and the distance between the first marker M1b and the second marker M2 in the captured image is reduced to b" relative to the distance b illustrated in FIG. 8. Therefore, the slope of the straight line connecting the positions of the plotted first markers M1a and M1b as a pair, that is, the above-described ratio, is reduced relative to the slope illustrated in FIG. 9. Incidentally, an amount s of the positional deviation of the second marker M2 with respect to the pair of the first markers M1a and M1b does not, of course, change even when the above-described ratio changes.

To convert the distance obtained from the captured image into the actual distance, the above-described ratio is needed, but the ratio changes with a change in the distance between the imaging unit 20 and the test pattern P. However, according to a method of the embodiment, even when the above-described ratio changes with a change in the distance between the imaging unit 20 and the test pattern P, it is possible to calculate the above-described ratio by using the distance that is between the pair of the first markers M1a and Nil in the captured image and that is obtained from a detection result obtained by the position detecting unit 112.

Referring back to FIG. 5, the actual distance calculating unit 114 calculates an actual distance between one of the first markers M1a and M1b as a pair and the second marker M2 by multiplying a distance between the one of the first markers M1a and M1b as a pair and the second marker M2 in the captured image by the ratio calculated by the ratio calculating unit 113. A difference between the actual distance calculated by the actual distance calculating unit 114 and the original actual distance obtained from the pattern data is a distance corresponding to the amount s of the positional deviation of the second marker M2 with respect to the pair of the first markers M1a and M1b. Incidentally, the distance between one of the first markers M1a and M1b as a pair and the second marker M2 in the captured image can be obtained as a distance in units of pixels between the position of the one of the first markers M1a and M1b as a pair and the position of the second marker M2 in the captured image, where the positions are detected by the position detecting unit 112. The actual distance calculated by the actual distance calculating unit 114 is sent to the adjusting unit 115.

The adjusting unit 115 calculates the amount s of the positional deviation based on the actual distance calculated by the actual distance calculating unit 114, and adjusts a parameter related to an image forming position used by the image forming unit, in accordance with the amount s of the positional deviation. The parameter related to the image forming position is, for example, a parameter for controlling an ink ejection timing of the recording head 6, a parameter for controlling the moving speed of the carriage 5, or the like. The adjusting unit 115 sends an adjustment value of each parameter to the control FPGA 120, thereby adjusting a control operation performed by the ink ejection control unit 123 or the motor control unit 125.

Operation Performed by the Image Forming Apparatus

Figure 11:
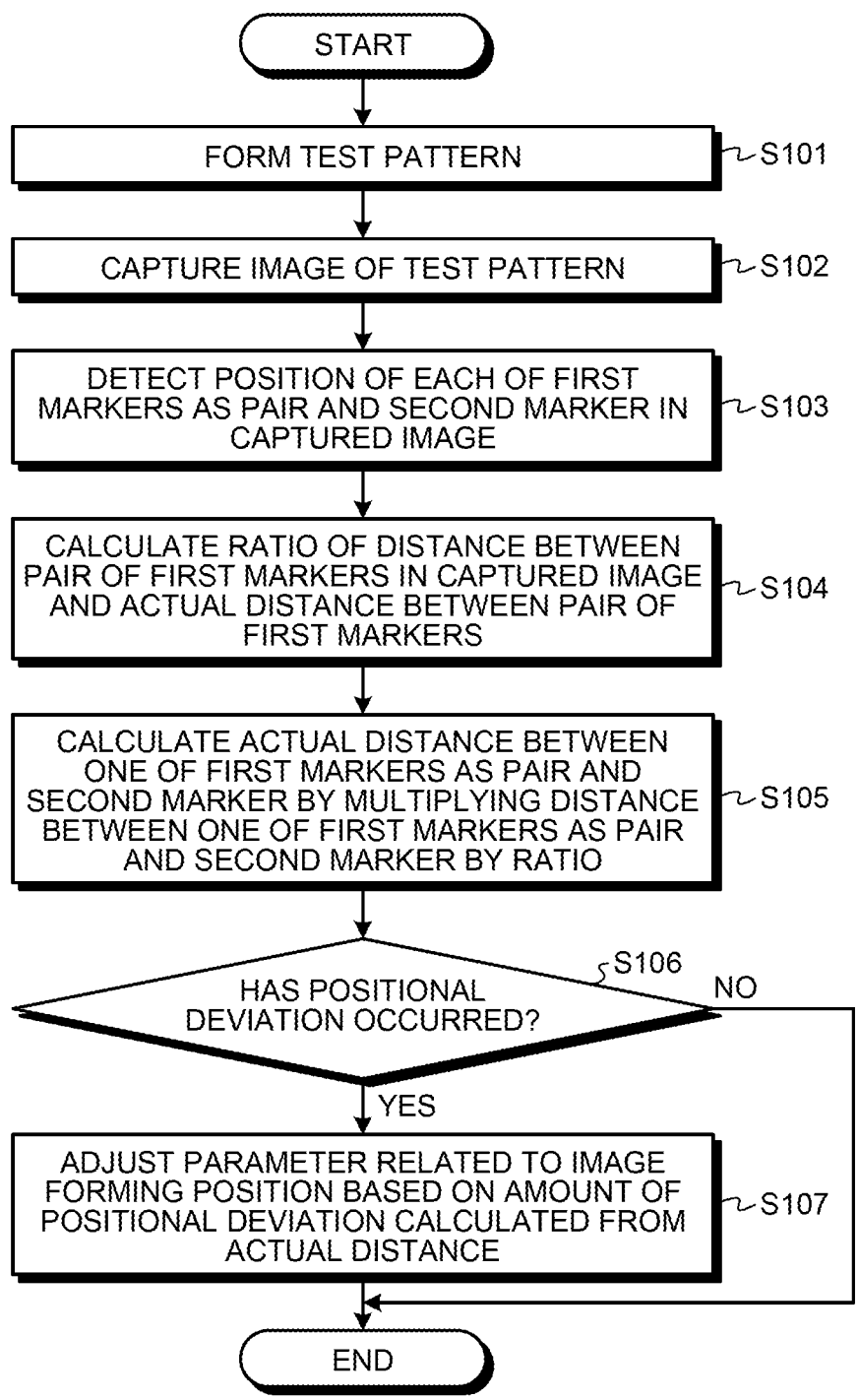
FIG. 11 is a flowchart for explaining an operation performed by the image forming apparatus in relation to adjustment of an image forming position.

An overview of an operation performed by the image forming apparatus 100 in relation to adjustment of the image forming position will be described below with reference to FIG. 11. FIG. 11 is a flowchart for explaining an operation performed by the image forming apparatus 100 in relation to adjustment of the image forming position.

If the recording medium M is set on the platen 16, the pattern forming unit 111 first causes the image forming unit to perform an image forming operation according to pattern data read from the ROM 102 or the like, and forms the test pattern P on the recording medium M (Step S101).

Subsequently, the imaging unit 20 captures an image of the test pattern P formed at Step S101, and outputs the captured image of the test pattern P (Step S102).

Then, the position detecting unit 112 analyzes the captured image of the test pattern P output at Step S102, and detects a position of each of the first markers M1a and M1b as a pair and the second marker M2 in the captured image (Step S103).

Subsequently, the ratio calculating unit 113 calculates the ratio of the distance between the pair of the first markers M1a and MTh in the captured image and the actual distance between the pair of the first markers M1a and M1b by using the positions of the pair of the first markers M1a and M1b in the captured image detected at Step S103 and by using the pattern data used to form the test pattern P at Step S101 (Step S104).

Then, the actual distance calculating unit 114 calculates an actual distance between one of the first markers M1a and M1b as a pair and the second marker M2 by multiplying a distance between the one of the first markers M1a and M1b as a pair and the second marker M2 in the captured image by the above-described ratio by using the positions of the pair of the first markers M1a and M1b and the second marker M2 in the captured image detected at Step S103, by using the pattern data used to form the test pattern P at Step S101, and by using the ratio calculated at Step S104 (Step S105).

Subsequently, the adjusting unit 115 compares the actual distance calculated at Step S105 with the original actual distance obtained from the pattern data, and determines whether a deviation of an ink landing position has occurred (Step S106). If it is determined that the deviation of the ink landing position has not occurred (NO at Step S106), a series of the operations ends. In contrast, if it is determined that the deviation of the ink landing position has occurred (YES at Step S106), the adjusting unit 115 calculates an amount of the positional deviation, which is a difference between the actual distance calculated at Step S105 and the original actual distance, adjusts a parameter related to an image forming position based on the amount of the positional deviation (Step S107), and ends the series of the operations.

As described above with specific examples, the image forming apparatus 100 of the embodiment forms the test pattern P including the pair of the first markers M1a and M1b and the second marker M2 that is formed under a condition different from a condition applied to the pair of the first markers M1a and M1b, and captures an image of the test pattern P by the imaging unit 20. Then, the image forming apparatus 100 calculates a ratio of the distance between the pair of the first markers M1a and M1b in the captured image and the actual distance between the pair of the first markers M1a and M1b, and calculates an actual distance between one of the first markers M1a and M1b as a pair and the second marker M2 by multiplying a distance between the one of the first markers M1a and M1b as a pair and the second marker M2 in the captured image by the above-described ratio. Then, the image forming apparatus 100 calculates an amount of a positional deviation representing a deviation of an ink landing position on the basis of the actual distance, and adjusts a parameter related to the image forming position in accordance with the amount of the positional deviation. Therefore, according to the image forming apparatus 100 of the embodiment, even in an environment in which the distance between the imaging unit 20 and the test pattern P changes, it is possible to calculate an actual distance corresponding to the amount of the positional deviation representing the deviation of the ink landing position on the basis of the captured image of the test pattern P, so that it is possible to improve image quality by adjusting a parameter related to the image forming position in accordance with the amount of the positional deviation.

Modifications of the Test Pattern

The test pattern P used in the embodiment is not limited to the example illustrated in FIG. 6, and various modifications are possible. In the following, the modifications of the test pattern P will be described.

Figure 12:
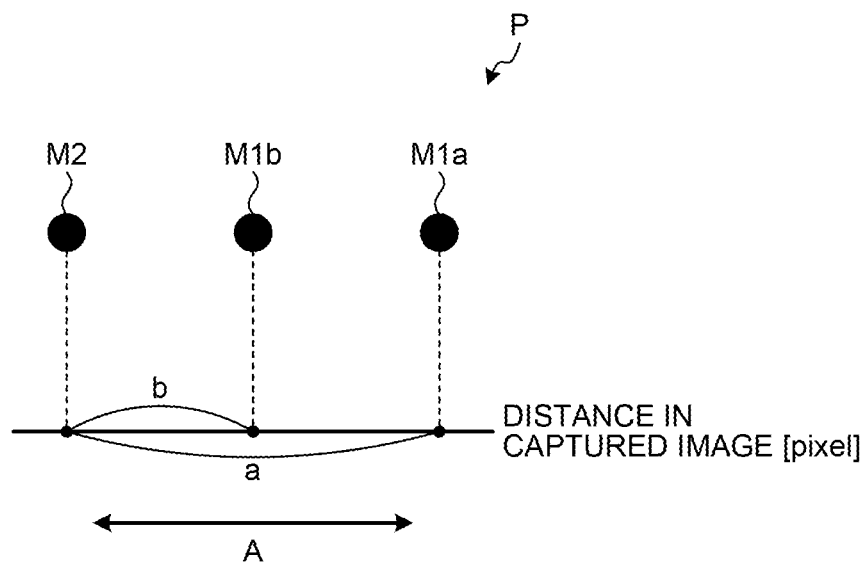
FIG. 12 is a diagram illustrating another example of the test pattern.

The test pattern P illustrated in FIG. 6 is configured such that the second marker M2 is formed in a position corresponding to the midpoint between the pair of the first markers M1a and M1b. However, as illustrated in FIG. 12, it may be possible to form the second marker M2 on the outside of the pair of the first markers M1a and M1b.

Figure 13:
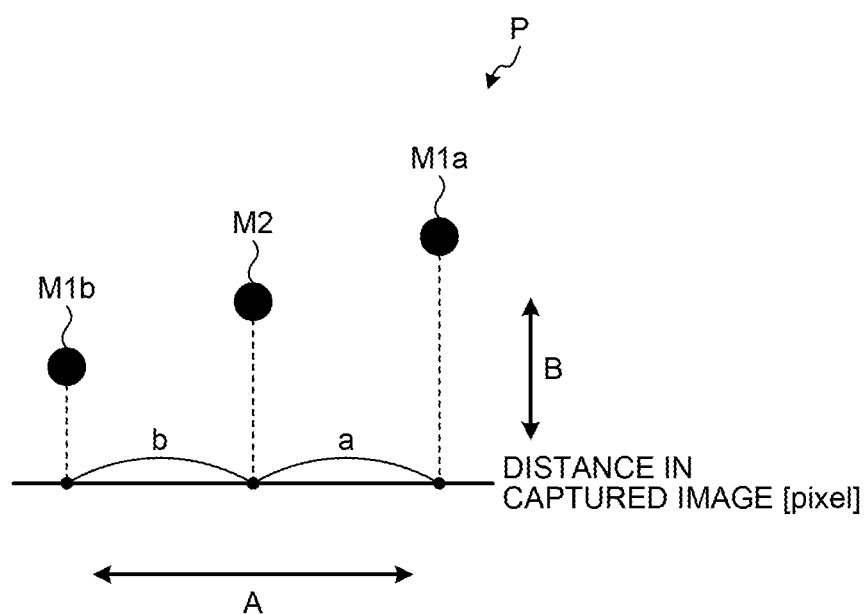
FIG. 13 is a diagram illustrating still another example of the test pattern.

Furthermore, the test pattern P illustrated in FIG. 6 is configured such that the pair of the first markers M1a and M1b and the second marker M2 are aligned in the main-scanning direction (in the direction A in FIG. 6). However, as illustrated in FIG. 13, it may be possible to form the pair of the first markers M1a and M1b and the second marker M2 in different positions in the sub-scanning direction (in the direction B in FIG. 13). In this case, each of the first markers M1a and M1b as a pair and the second marker M2 is formed with ink ejected from a different nozzle of the recording head 6.

Figure 14:
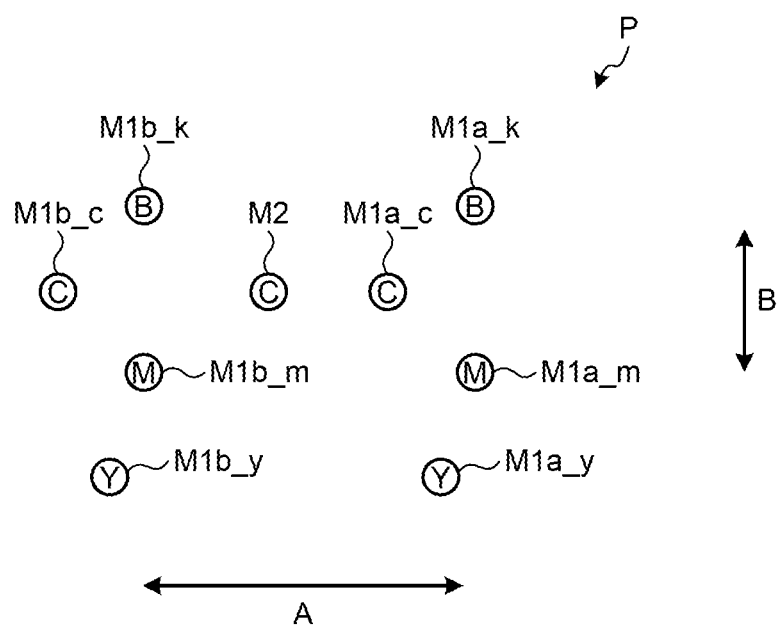
FIG. 14 is a diagram illustrating still another example of the test pattern.

Moreover, it is assumed that the test pattern P illustrated in FIG. 6 is formed by using the single recording head 6. However, the test pattern P as described above may be formed by each of the recording heads 6 for different colors provided on the carriage 5. In this case, as illustrated in FIG. 14, it may be possible to share the second marker M2 among the test patterns P formed by a plurality of the recording heads 6 for the respective colors. FIG. 14 illustrates a test pattern P that includes a pair of first markers M1a k and M1b k formed by using the recording head 6k, a pair of first markers M1a c and M1b c and the second marker M2 formed by using the recording head 6c, a pair of first markers M1a m and M1b m formed by using the recording head 6m, and a pair of first markers M1a y and M1b y formed by using the recording head 6y. In this configuration, the second marker M2 formed by using the recording head 6c is used as the second marker M2 shared among the test patterns of the respective colors.

Figure 15:
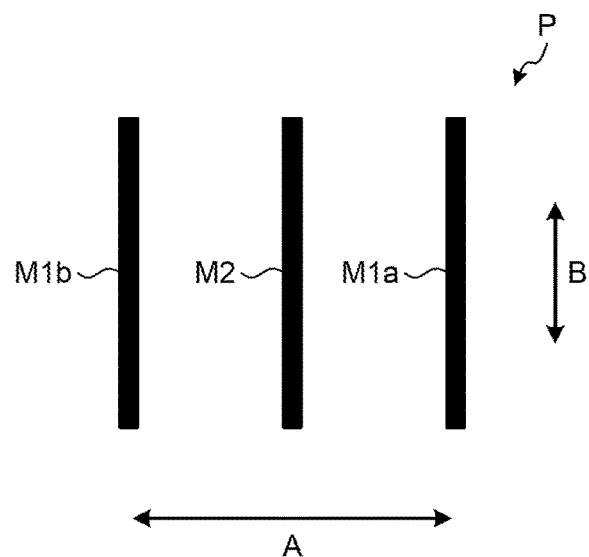
FIG. 15 is a diagram illustrating still another example of the test pattern.
Figure 16:
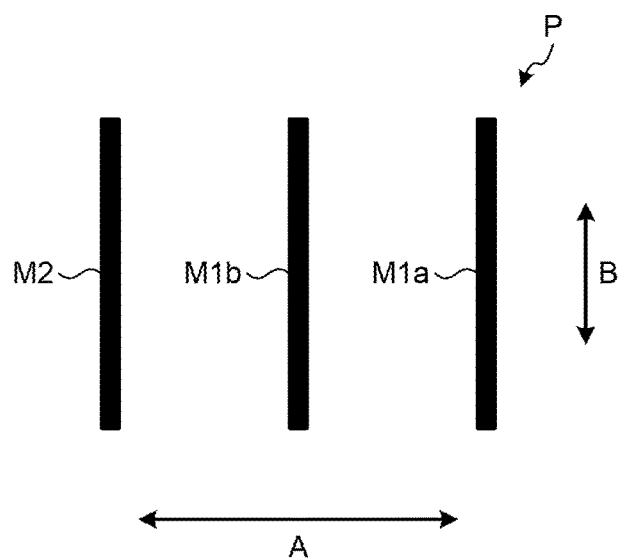
FIG. 16 is a diagram illustrating still another example of the test pattern.
Figure 17:
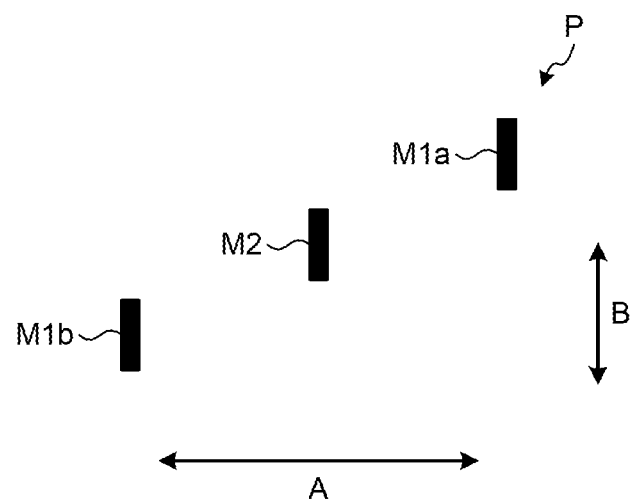
FIG. 17 is a diagram illustrating still another example of the test pattern.
Figure 18:
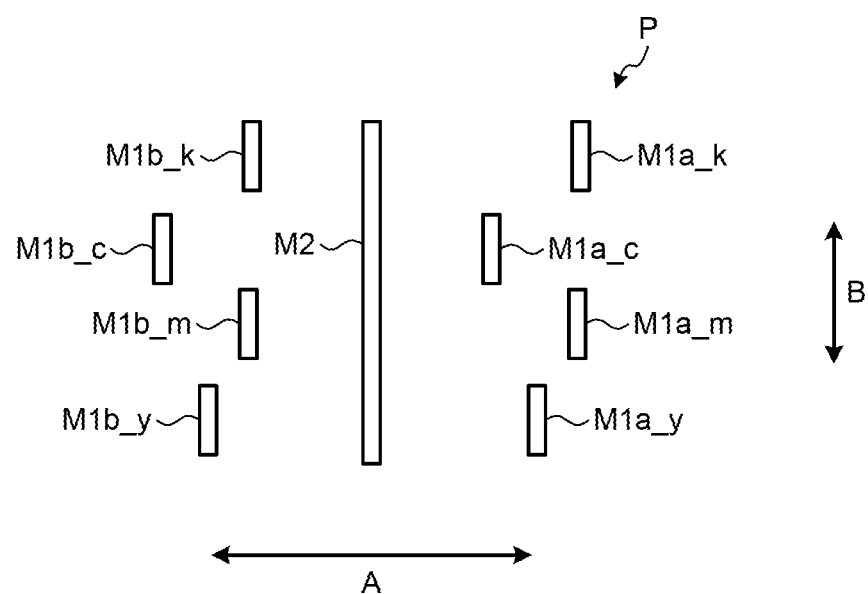
FIG. 18 is a diagram illustrating still another example of the test pattern.

Furthermore, the above-described test pattern P is configured such that the pair of the first markers M1a and M1b and the second marker M2 are formed as dots. However, as illustrated in FIG. 15 to FIG. 18, it may be possible to form the pair of the first markers M1a and M1b and the second marker M2 in linear shapes extending in the sub-scanning direction (in the direction B in the drawings) that is a direction perpendicular to the main-scanning direction as the moving direction of the carriage 5. FIG. 15 illustrates an example in which the test pattern P illustrated in FIG. 6 is formed with linear markers. FIG. 16 illustrates an example in which the test pattern P illustrated in FIG. 12 is formed with linear markers. FIG. 17 illustrates an example in which the test pattern P illustrated in FIG. 13 is formed with linear markers. FIG. 18 illustrates an example in which the test pattern P illustrated in FIG. 14 is formed with linear markers. As described above, by forming the test pattern P with linear markers, it becomes possible to effectively prevent inconvenience including erroneous detection of the position of a marker due to the influence of disturbance, such as dust adhering to the recording medium M or dirt due to ink mist, so that it becomes possible to measure a distance with high accuracy.

Additional Explanation

The functional components of the image forming apparatus 100 of the embodiment related to adjustment of the image forming position are implemented by causing the CPU 110 to execute a predetermined program as described above. For example, the program executed by the CPU 110 is provided by being incorporated in advance in the ROM 102 or the like inside the image forming apparatus 100. Furthermore, the program executed by the CPU 110 may be provided by being recorded in a non-transitory computer-readable recording medium, such as a compact disc-read only memory (CD-ROM), a flexible disk (FD), a compact disk-recordable (CD-R), a digital versatile disc (DVD), in a computer-installable or computer-executable file format. Moreover, the program executed by the CPU 110 may be stored in a computer connected to a network, such as the Internet, and may be provided by being downloaded via the network. Furthermore, the program executed by the CPU 110 may be provided or distributed via a network, such as the Internet.

The program executed by the CPU 110 has a module structure including the above-described functional components of the image forming apparatus 100 of the embodiment (the pattern forming unit 111, the position detecting unit 112, the ratio calculating unit 113, the actual distance calculating unit 114, and the adjusting unit 115). As actual hardware, for example, the CPU 110 appropriately reads the program from the ROM 102 and executes the program, so that the above-described functional components are generated on the RAM 103.

While the embodiment of the present invention has been explained in detail above, the present invention is not limited to the embodiment as it is, and may be embodied with various modifications or changes within the scope of the invention.

For example, while the pattern forming unit 111, the position detecting unit 112, the ratio calculating unit 113, the actual distance calculating unit 114, and the adjusting unit 115 are implemented by the program executed by the CPU 110 in the above-described embodiment, part or all of the units may be implemented by, for example, a dedicated processor called coprocessor, or by using dedicated hardware, such as an ASIC or an FPGA.

Furthermore, while the functions of the position detecting unit 112, the ratio calculating unit 113, and the actual distance calculating unit 114 are implemented by the CPU 110 mounted on the main control board 130 of the image forming apparatus 100 in the above-described embodiment, it may be possible to implement the functions of the position detecting unit 112, the ratio calculating unit 113, and the actual distance calculating unit 114 by the imaging unit 20. In this case, the imaging unit 20 is configured to include a hardware resource, such as a processor or a memory for executing a program, or dedicated hardware, such as an ASIC or an FPGA. In this configuration, the imaging unit 20 functions as the distance measuring device according to the present invention.

Moreover, while the present invention is applied to the image forming apparatus 100 configured as a serial-head inkjet printer in the above-described embodiment, the present invention can be applied to various types of image forming apparatuses. For example, in a line-head inkjet printer, a deviation of an ink landing position may occur due to a positional deviation between recording heads. By applying the present invention, it becomes possible to accurately obtain an amount of a positional deviation when the deviation of the ink landing position as described above occurs, and it becomes possible to improve image quality by adjusting a parameter related to an image forming position in accordance with the amount of the positional deviation.

Furthermore, for example, in a tandem-type electrophotography image forming apparatus, a positional deviation of an image corresponding to a deviation of an ink landing position in the inkjet printer may occur due to a positional deviation between photoconductor drums that form images of different colors. By applying the present invention, it becomes possible to accurately obtain an amount of a positional deviation when the positional deviation of the image as described above occurs, and it becomes possible to improve image quality by adjusting a parameter related to an image forming position in accordance with the amount of the positional deviation.

According to the embodiment of the present invention, even when a distance between an imaging unit and a test pattern changes, it is possible to appropriately calculate an actual distance corresponding to an amount of a positional deviation on the basis of a captured image captured by the imaging unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device, comprising:
    an imaging unit, including an image sensor, configured to capture an image of a test pattern including at least a pair of first markers and a second marker that is formed under a condition different from a condition applied to the pair of the first markers; and
    processing circuitry configured to
        detect a position of each of the first markers and the second marker in the captured image;
        calculate a ratio of (1) a first captured distance between the pair of the first markers in the captured image, which is determined from the detected positions, and (2) a first actual distance between the pair of the first markers, calculate a second actual distance between one of the first markers and the second marker by multiplying a second captured distance between the one of the first markers and the second marker in the captured image, which is determined from the detected positions, by the calculated ratio, and calculate an amount of a positional deviation based on the calculated second actual distance, adjust, based on the positional deviation amount, a parameter related to an image forming position, and send the adjusted parameter to a controller of an image forming apparatus to control an image formation process.

2. The device of claim 1, wherein the processing circuitry is further configured to adjust a parameter for controlling an ink ejection timing of a recording head as the parameter related to the image forming position.

3. The device of claim 1, wherein the processing circuitry is configured to adjust a parameter for controlling a moving speed of a carriage as the parameter related to the image formula position.

4. A method, comprising:
capturing an image of a test pattern including at least a pair of first markers and a second marker that is formed under a condition different from a condition applied to the pair of the first markers;
detecting a position of each of the first markers and the second marker in the captured image;
calculating a ratio of (1) a first captured distance between the pair of the first markers in the captured image, which is determined from the detected positions, and (2) a first actual distance between the pair of the first markers;
calculating a second actual distance between one of the first markers and the second marker by multiplying a second captured distance between the one of the first markers and the second marker in the captured image, which is determined from the detected positions, by the calculated ratio; and
calculating an amount of a positional deviation based on the calculated second actual distance, adjusting, based on the positional deviation amount, a parameter related to an image forming position, and sending the adjusted parameter to a controller of an image forming apparatus to control an image formation process.

* * * * *